Sept. 4, 1934.   C. C. FARMER   1,972,732
BRAKE CYLINDER LUBRICATOR
Filed Sept. 29, 1932   2 Sheets-Sheet 2
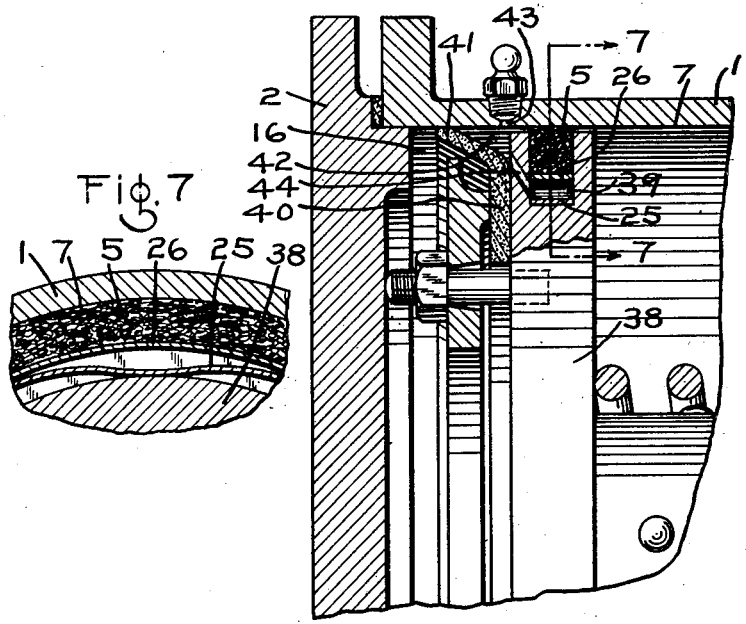
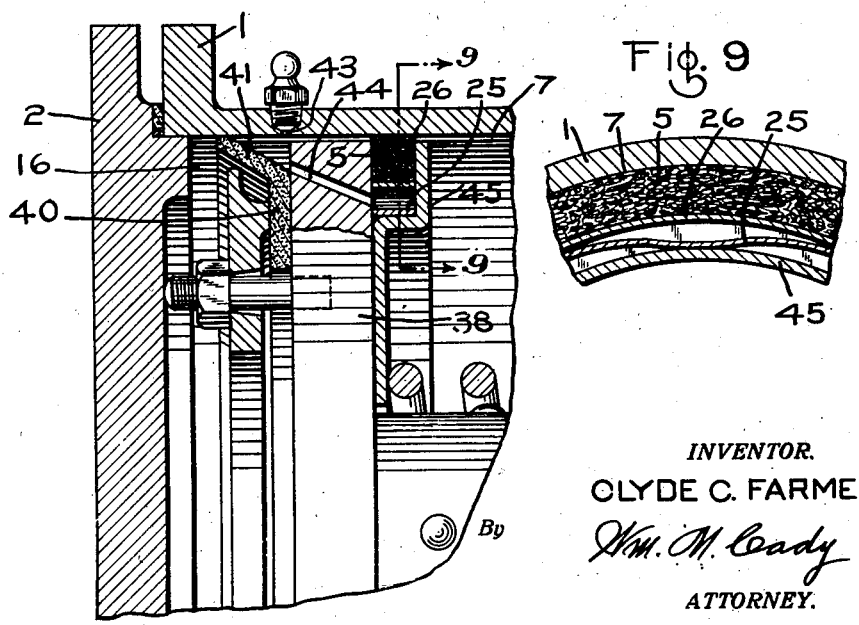
INVENTOR.
CLYDE C. FARMER
ATTORNEY.

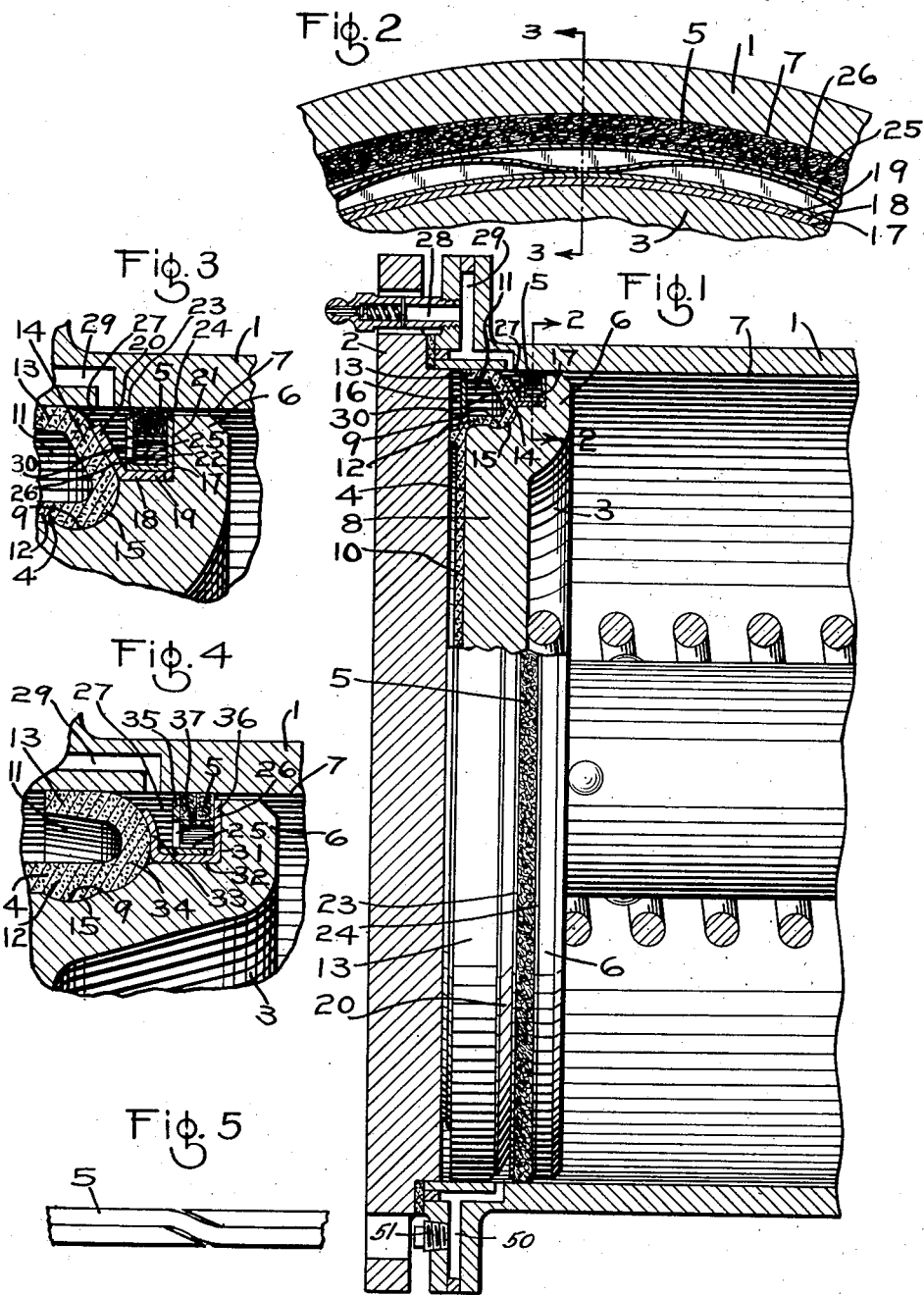

Patented Sept. 4, 1934

1,972,732

UNITED STATES PATENT OFFICE 1,972,732

BRAKE CYLINDER LUBRICATOR

Clyde C. Farmer, Pittsburgh, Pa., assignor to The Westinghouse Air Brake Company, Wilmerding, Pa., a corporation of Pennsylvania Application September 29, 1932, Serial No. 635,312

10 Claims. (Cl. 184—18)

This invention relates to cylinders, in which pistons carrying flexible packings are adapted to have a reciprocating movement and has particular reference to means for lubricating the interior surface of the cylinder wall and the surface of the piston packing which is in contact with the cylinder wall.

The principal object of my invention is to provide improved means for maintaining the proper lubrication of the interior surface of the cylinder wall and the surface of the piston packing in contact with this wall, without the necessity of removing the cylinder head and withdrawing of the piston from the cylinder.

Another object of my invention is to provide a piston construction in which there is a lubricant retaining groove provided between the piston head and the packing carried thereby, and which is further provided with a fibrous ring which is adapted to absorb lubricant from the groove and to spread it over the interior surface of a cylinder wall and which, when the piston is mounted in the cylinder, will prevent the lubricant from flowing beyond the non-pressure side of the piston head.

A further feature resides in the provision of means, accessible from the exterior of the cylinder, through which lubricant is adapted to be supplied to a lubricant retaining groove provided between the head and packing of a piston mounted in the cylinder.

Other objects and advantages will appear in the following more detailed description of the invention.

In the accompanying drawings, Fig. 1 is a sectional view of a portion of a brake cylinder device embodying one form of my invention, a portion of the piston of the device being shown in section and another portion being shown in edge elevation; Fig. 2 is an enlarged fragmentary view of the same taken on the line 2—2 of Fig. 1; Fig. 3 is a fragmentary cross sectional view through a portion of the cylinder and piston taken on the line 3—3 of Fig. 2; Fig. 4 is a cross sectional view, corresponding with Fig. 3, of a modification of the invention; Fig. 5 is a detail view of a portion of the lubricant distributing ring shown in Fig. 4; Fig. 6 is a sectional view of a portion of a brake cylinder device embodying another form of my invention; Fig. 7 is a sectional view of the same taken on the line 7—7 of Fig. 6; Fig. 8 is a sectional view, similar to Fig. 6, but showing another form of my invention; and Fig. 9 is a sectional view taken on the line 9—9 of Fig. 8.

The construction shown in Figs. 1 to 3, inclusive, of the drawings, comprises a brake cylinder 1 having the usual pressure head 2 and containing a piston which comprises a piston head 3, a circular packing member 4 and a lubricant distributing ring 5, the packing member and ring being carried by the piston head.

The piston head 3 has a circular guide portion 6 which is adapted to slidably contact with the interior surface 7 of the wall of the brake cylinder 1 and also has a circular portion 8 which is of less diameter than the guide portion 6, the peripheral surface of the portion 8 being provided with a groove 9.

The packing member 4 is cup shaped, having a central flat portion 10 and an annular edge corrugation 11 which extends rearwardly from the plane of the portion 10, which corrugation comprises spaced inner and outer walls 12 and 13 respectively, and a bottom portion 14, the wall 12 having an annular bead 15 formed on its inner surface. The packing member is forced over the portion 8 of the piston head, and when in its proper position, as shown in Fig. 1, the bead 15 snaps into the groove 9 and secures the packing member to the piston head without the use of separate securing means.

The open side of the corrugation is in communication with the pressure chamber 16 at one side of the piston and the wall 13 of the corrugation is in close contact with the interior surface 7 of the brake cylinder wall.

Between the guide portion 6 and the portion 8, the piston head is provided with a circular ledge 17 over which an annular metallic ring 18 fits. This ring 18 is preferably of angular form in cross section, having a flange 19 which is spot welded or otherwise suitably secured to the piston head, and also having an outwardly flaring annular flange 20 which is adapted to be engaged by the bottom portion 14 of the packing corrugation 11.

The ring 18 carries a U-shaped metallic ring 21, having a web 22 which is spot welded or otherwise secured to the flange 19 of the ring 18 and having spaced outwardly directed side walls 23 and 24, between which the lubricant distributing ring 5 is mounted. This lubricant distributing ring is made of felt or any other suitable lubricant absorbing material and is maintained in wiping contact with the interior surface 7 of the brake cylinder wall by a split annular spring 25, there being a split ring 26 interposed between the spring and the ring 5 to insure an even distribution of the spring pressure over the entire inner surface of the ring 5 and also provides a wearing surface for the spring, thus the spring is prevented from wearing the felt ring.

It will be noted that a portion of the interior surface of the brake cylinder wall, the flange 20 of the ring 18, a portion of the packing, the wall 23 of the ring 21 and the distributing ring 5 define a lubricant retaining chamber 27 which extends entirely around the piston.

When the piston is in its normal inner position, as shown in Figs. 1 and 3, lubricant is supplied to the chamber 27 by way of a passage 28 in a check valve fitting having screw-threaded connection with the brake cylinder and through a passage 29 in the brake cylinder.

Lubricant supplied to the chamber 27 will flow past the wall 23 of the ring 21 and will be absorbed by the felt distributing ring 5, so that when the piston is reciprocated in the cylinder 1, the lubricant will be evenly distributed over the surface 7 of the cylinder.

The ring 5, being maintained in close contact with the surface 7 of the brake cylinder wall by the action of the spring 25, will prevent the lubricant from flowing from the chamber 27 to the non-pressure side of the piston and the wall 13 of the corrugation 11, being in close contact with the surface 7, will prevent the flow of lubricant to the pressure side of the piston.

The flange 20 of the ring 18 engages the bottom portion 14 of the corrugation 11 of the packing and prevents this portion of the packing from moving inwardly under the influence of fluid under pressure supplied to the pressure side of the piston, so that there will be no tendency of the packing forcing the lubricant from the chamber 27.

In this form of my invention, the lubricant distributing ring 5 may be continuous or, if desired, may be split and the meeting ends scarfed and overlapped so that there will be no opening through which lubricant may freely flow.

The wall 23 of the ring 21 is provided with spaced openings 30, through which lubricant may flow from the chamber 27 to the space between the walls 23 and 24, thus providing for the lubrication of the friction surfaces of the spring 25.

At a point spaced about 180° from the passage 29, the brake cylinder is provided with a similar passage 50 which is normally closed to the exterior of the brake cylinder by a plug 51 having screw-threaded connection with the brake cylinder, which plug may be removed preparatory to supplying the lubricant to the chamber 27.

After the chamber 27 has been completely filled with the lubricant supplied by way of the check valve fitting and passage 29, excess lubricant will be forced out through passage 50 and thus indicate that the chamber has been properly filled with lubricant. Since the excess lubricant will thus be expelled from the chamber 27, the danger of forcing the lubricant past the piston packing to the pressure chamber 16 and past the guide portion of the piston head and the lubricant distributing member 5 to the non-pressure side of the piston, is effectively prevented. After the chamber 27 is properly filled with lubricant the supply of lubricant is closed off, and the plug 51 is again screwed in place to close communication from the chamber 27 to the exterior of the brake cylinder by way of passage 50.

As shown in Fig. 1 of the drawings, the passage 29 and check valve fitting associated therewith are located at the top of the brake cylinder in which position there will be no leakage of lubricant from the chamber 27 by way of the passage and fitting. When the brake cylinder is so mounted on a vehicle that the passage 50 is located above the passage 29, the plug 51 and check valve fitting will be substituted one for the other.

In Fig. 4 of the drawings another embodiment of the invention is illustrated, in which a metallic ring 31, which corresponds to the ring 18 in the form of the invention shown in Figs. 1, 2 and 3, is secured to the piston head 3. This ring 31 is provided with a web 32 which is spot welded or otherwise secured to the piston head 3, and is also provided with a curved outwardly flaring flange 33 which is adapted to support the curved bottom portion of a corrugation 34 formed in the packing. The ring 31 is also provided with spaced outwardly extending flanges 35 and 36, the flange 35 being welded or otherwise secured to the web 32 and the flange 36 being integral with the web. These flanges 35 and 36 correspond to the walls 23 and 24 of the construction illustrated in Figs. 1, 2 and 3, and provide a space for the reception of the lubricant distributing ring 5, the split ring 26 and the circular spring 25. The flange 35 is provided with openings 37 through which the friction surfaces are lubricated.

In this construction, the lubricant distributing ring is made from a strip of felt or other absorbent material which is wrapped twice around the piston. As shown in Fig. 5 of the drawings, the material is offset between the ends thereof, so that there will be no open space between the ends of the material through which the lubricant may freely flow.

Aside from the differences noted, the construction shown in Fig. 4 is substantially the same as that shown in Figs. 1, 2 and 3.

In Figs. 6 and 7 another embodiment of my invention is illustrated, in which the piston comprises a piston head 38, having an annular groove 39 formed therein for the reception of the lubricant distributing ring 5, as well as the split ring 26 and spring 25 which maintain the ring 5 in contact with the surface 7 of the brake cylinder. This piston also comprises the usual packing cup 40 which is clamped to the piston head in the usual manner, said cup having a skirt portion 41 in contact with the surface 7 of the brake cylinder. In this form of the invention the skirt portion 41 of the packing cup, the cylinder wall and the distributing ring 5 define a lubricant receiving chamber 42. When the piston is in its normal inner position as shown in Fig. 6, the lubricant is supplied to the chamber 41 by way of a passage in a check valve fitting having screw-threaded connection with the cylinder 1 and through a passage 43 in the cylinder. In this construction the friction surfaces of the spring 25 will be lubricated by lubricant which may flow through passages 44 in the piston leading from the chamber 42 to the groove 39 containing the spring.

In Figs. 8 and 9 still another form of my invention is illustrated, which is quite similar to the construction shown in Fig. 6, the only material difference being that in the construction shown in Fig. 8, an annular plate 45 is welded or otherwise secured to the non-pressure side of the piston head to provide a recess for the reception of the lubricant distributing ring 5, ring 26 and spring 25.

It will be understood that in each of the forms of the invention illustrated in the drawings there must be a clearance space provided between the sides of the spring and split rings 25 and 26, respectively, and the portions of the piston forming guides for the spring and ring to permit free movement of the spring and ring in maintaining the lubricant distributing ring 5 in contact with the cylinder wall, and through this clearance space lubricant is adapted to flow to the distributing ring 5.

From the foregoing description it will be seen that my improved construction will insure the proper lubrication of the friction surfaces of a cylinder device and that lubricant may be supplied to the device without the necessity of removing the cylinder head and withdrawing the piston from the cylinder.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. The combination with a cylinder, of a reciprocable piston mounted in said cylinder and slidably contacting with the interior surface of said cylinder, said piston having a groove for receiving a lubricant, a flexible ring of porous material for conducting lubricant from said groove to the interior surface of the cylinder and for spreading the lubricant over said surface, a spring ring for maintaining said flexible ring in close engagement with said surface, a split ring interposed between and in engagement with the flexible ring and the spring ring adapted to distribute the pressure of the spring ring evenly over the flexible ring, and means for conducting lubricant from said groove to the friction surfaces of said spring ring and split ring.

2. The combination with a cylinder, of a piston in said cylinder comprising a piston head and a packing carried by said piston head, said packing slidably contacting with the interior surface of the cylinder, a member carried by said piston and contacting with the interior surface of the cylinder, said member adapted to conduct a lubricant from a groove formed in the piston by said packing and member to the interior surface of the cylinder, and means through which lubricant is adapted to be supplied to said groove when the piston is in its normal inner position.

3. The combination with a cylinder and a piston in said cylinder comprising a piston head, of a piston packing secured to said head and having an annular peripheral corrugation comprising spaced side walls and a bottom wall connecting said side walls, one of said side walls being in sliding contact with the interior surface of the cylinder and the other of said walls being secured to the piston head, means for spreading a lubricant over the interior surface of the cylinder, said means, bottom wall of said corrugation and the interior surface of the cylinder defining a lubricant receiving chamber from which the spreading means receives its supply of lubricant, and means supporting the bottom wall of said corrugation against distortion in the direction of the lubricant spreading means.

4. The combination with a cylinder and a piston in said cylinder comprising a piston head, of a piston packing secured to said head and having an annular peripheral corrguation comprising spaced side walls and a bottom wall connecting said side walls, one of said side walls being in sliding contact with the interior surface of the cylinder and the other of said walls being secured to the piston head, means for spreading a lubricant over the interior surface of the cylinder, said means, bottom wall of said corrugation and the interior surface of the cylinder defining a lubricant receiving chamber from which the spreading means receives its supply of lubricant, means associated with the cylinder through which lubricant is adapted to be supplied to said chamber, and means carried by said piston head adapted to prevent the bottom wall of said corrugation from moving to exert pressure on the lubricant in said groove.

5. The combination with a cylinder, of a piston in said cylinder and comprising a piston head having a circular guide portion adapted to slidably contact with the inner surface of the wall of the cylinder and also having a circular portion of less diameter than the guide portion and extending forwardly from the guide portion, and a circular piston packing covering the face of the second mentioned portion of piston head and having its outer edge portion in the form of a corrugation comprising spaced side walls and a wall connecting said side walls, one of said side walls being in engagement with the peripheral surface of the second mentioned portion of the piston head and the other of said side walls being in sliding contact with the inner surface of the wall of the cylinder, the inner surface of said corrugation, the inner surface of the cylinder wall and the guide portion of the piston head defining a lubricant receiving chamber.

6. The combination with a cylinder, of a piston in said cylinder and comprising a piston head having a circular guide portion adapted to slidably contact with the inner surface of the wall of the cylinder and also having a circular portion of less diameter than the guide portion and extending forwardly from the guide portion, a circular piston packing covering the face of the second mentioned portion of the piston head and having its outer edge portion in the form of a corrugation comprising spaced side walls and a wall connecting said side walls, one of said side walls being in engagement with the peripheral surface of the second mentioned portion of the piston head and the other of said side walls being in sliding contact with the inner surface of the wall of the cylinder, the inner surface of said corrugation, the inner surface of the cylinder wall and the guide portion of the piston head defining a lubricant receiving chamber, and means contained in said chamber and carried by the piston for resisting distortion of the corrugated portion of the packing in a direction toward the guide portion of the piston.

7. The combination with a cylinder, of a piston in said cylinder and comprising a piston head having a circular guide portion adapted to slidably contact with the inner surface of the wall of the cylinder and also having a circular portion of less diameter than the guide portion and extending forwardly from the guide portion, a circular piston packing covering the face of the second mentioned portion of the piston head and having its outer edge portion in the form of a corrugation comprising spaced side walls and a wall connecting said side walls, one of said side walls being in engagement with the peripheral surface of the second mentioned portion of the piston head and the other of said side walls being in sliding contact with the inner surface of the wall of the cylinder, the inner surface of said corrugation, the inner surface of the cylinder wall and the guide portion of the piston head defining a lubricant receiving chamber, and an annular member located within said chamber and having a flange secured to said piston head and also having a flange adapted to prevent distortion of the corrugated portion of the packing in a direction toward the guide portion of the piston head.

8. The combination with a cylinder, of a piston in said cylinder and comprising a piston head having a circular guide portion adapted to slidably contact with the inner surface of the wall of the cylinder and also having a circular portion of less diameter than the guide portion and extending forwardly from the guide portion, a circular piston packing covering the face of the second mentioned portion of the piston head and having its outer edge portion in the form of a corrugation comprising spaced side walls and a wall connecting said side walls, one of said side walls being in engagement with the peripheral surface of the second mentioned portion of the piston head and the other of said side walls being in sliding contact with the inner surface of the wall of the cylinder, the inner surface of said corrugation, the inner surface of the cylinder wall and the guide portion of the piston head defining a lubricant receiving chamber, and an annular member located within said chamber and having a flange secured to said piston head and also having a flange adapted to engage the rear surface of said corrugated portion of the packing and prevent distortion of the corrugation when the pressure face of the piston is subjected to fluid under pressure.

9. The combination with a cylinder, of a piston in said cylinder and comprising a piston head having a circular guide portion adapted to slidably contact with the inner surface of the wall of the cylinder and also having an annular groove, piston packing carried by said piston head which together with said head defines an annular lubricant receiving chamber, said chamber being in constant open communication with said groove, lubricant distributing means carried by said piston head within said groove and contacting with the inner surface of the wall of the cylinder, and means through which lubricant is adapted to be supplied to said chamber and consequently to said groove and lubricant distributing means.

10. The combination with a cylinder, of a piston in said cylinder and comprising a piston head having a circular guide portion adapted to slidably contact with the inner surface of the wall of the cylinder and also having an annular groove, piston packing carried by said piston head which together with said head defines an annular lubricant receiving chamber, said chamber being in constant open communication with said groove, means through which lubricant is adapted to be supplied to said chamber and consequently to said groove, and an annular member of absorbent material carried by said piston head within said groove for conducting lubricant from said groove to the inner surface of the wall of the cylinder.

CLYDE C. FARMER.